Aug. 23, 1932.     J. H. KING     1,872,969
PORTABLE DRILL
Filed Feb. 24, 1930
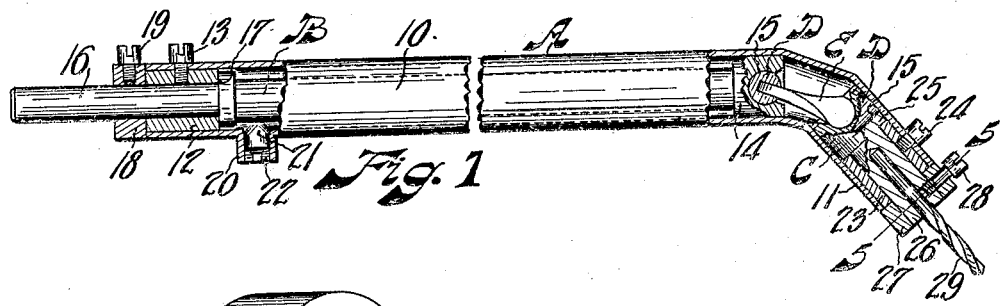
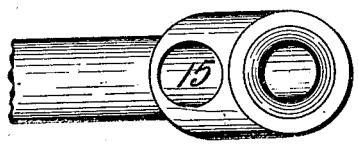
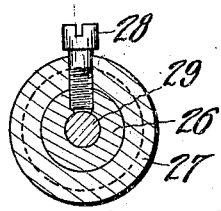
INVENTOR
John H. King
BY
C. F. Heinkel.
ATTORNEY Patented Aug. 23, 1932

1,872,969

UNITED STATES PATENT OFFICE

JOHN H. KING, OF CLEVELAND, OHIO

PORTABLE DRILL

Application filed February 24, 1930. Serial No. 430,811.

My invention relates to portable drill.

The object of my invention is to provide a simple and efficient and easily operable portable machining device in which various tools can be used; by means of which various tools can be rotated; which can reach into otherwise inaccessible places to perform a machining operation therein; in which the moving mechanism is inclosed in a casing; which has means to receive and hold a quantity of lubrication material to insure continued lubrication of the moving members in the device.

Other objects will be pointed out below in this specification or will become obvious or apparent or will suggest themselves upon an inspection of this specification and the accompanying drawing.

I attain my object by the mechanism shown in the accompanying drawing in which:

Fig. 1 is a side view of a portable machining device, a drilling device, embodying my invention, partly in section to show interior relations and having an angular relation between the driving spindle and the driven or drill rotating spindle thereof.

Fig. 2 is a perspective view, on a larger scale, of the inner ends of the driving and driven spindles of Fig. 1.

Fig. 3 is a perspective view, on a larger scale, of the link member of the connector means for connection of the spindles.

Fig. 4 is a perspective view, on a larger scale, of the stub members of the connector means for connection of the spindles.

Fig. 5 is a transverse section, on a larger scale, taken in a plane indicated by the line 5—5 in Fig. 1.

Similar reference characters refer to similar parts throughout the views.

Quite frequently it is desirable or necessary or convenient to drill a hole or perform another machining operation or a driving operation for a screw and the like in or on a wall which is not open for direct access thereto with the usual tools or devices or where for other reasons the working space between that wall is limited so that the usual tools can not be used or where the wall is otherwise inaccessible or inconveniently accessible. Since the usual tools can not be used directly, it is necessary that sufficient room or space must be made by removal of obstructions which must be replaced after the machining or other operation is completed, or a special tool or device must be made, all of which requires time and expense.

My invention provides a device which can reach into narrow spaces, as between two walls, and perform an operation on either one or on both of the walls or on any other element in the space and thereby saves considerable time and expense.

Referring now specifically to the device shown in the accompanying drawing:

The casing A is shown as being rigid, made of round tubing having the main part 10 which conveniently serves the purpose of a handle, and the angular part 11.

The driving spindle B, as shown, extends longitudinally into the part 10, is journaled at the outer end in the bearing 12 held in the outer end of the part 10 by means of the screw 13, has the head 14 on the inner end thereof journaled in the tubing and having the hole 15 through the same, the outer end 16 thereof extends outside of the end of the part 10 for taking hold purposes by a chuck or motor or crank or other power or manual rotating means, and has the shoulder 17 bearing against the inner end of the bearing 12 to retain the spindle B against longitudinal displacement outwardly of the device.

The collar 18, as shown, abuts the outer end of the main part 10 to retain the spindle B against longitudinal displacement inwardly of the device and is held in position on and to rotate with the spindle by means of the screw 19.

The tubular boss 20, as shown, is built up on the part 10, to open into the comparatively large space 21, is threaded internally, and has the externally threaded cover 22 to normally close the same and to be opened for the purpose of inserting a lubricant into the interior of the device sufficient to last for a long time so that the device needs no frequent lubrication attention and is protected against running dry and consequent injury to parts thereof and will run freely and efficiently for a long time.

The driven or tool rotating spindle C, as shown, extends longitudinally into the angular part 11 of the casing, is journaled at the outer end in the bearing 23 held in the outer end of the part 11 by means of the screw 24, has the head 25 on the inner end thereof journaled in the tubing and having the hole 15 through the same, the outer end 26 thereof extends outside of the end of the part 11, and there is a socket therein open at the outer end thereof for insertion of tools.

The collar 27, as shown, abuts the outer end of the part 11 to retain the spindle C against longitudinal displacement inwardly of the device and is held in position on the end 26 and to rotate with the spindle C by means of the screw 28 which also holds the drill 29 in position in the socket.

The stubs D, as shown, are journaled in the corresponding heads of the spindles and each has the slot 30 longitudinally thereof.

The link member E, as shown, has the laterally flat and endwise rounded ends 31 and 32 angular with each other and extending into and pivotally seated in the corresponding slots in the stubs D.

When the spindle B is rotated, the head 14 rotates therewith and thereby rotates the stub D therein on the transverse axis thereof. This rotation rotates the link E on its longitudinal axis and thereby rotates the stub D in the spindle C on its transverse axis and rotates the spindle C on its longitudinal axis and thereby rotates the drill.

During the rotation mentioned, the link floats between the spindle heads but is drivingly engaged with both of them and accomodates itself automatically to the various rotative positions of the stubs so that an angular spindle drive is effected through the connector means.

I am aware that changes and modifications can be made in the structure and in the arrangement of the device and in the parts thereof as shown and described within the scope of the appended claims; therefore, without limiting myself to the precise structure and arrangement of the device and the parts thereof as shown and described,

I claim:

A machining device comprising in combination a rigid casing having one end thereof angular with the main part thereof, a driven member journaled in said angular part, a driving member journaled in said main part and having a portion diametrically smaller than the inside of said casing, a connector means between said driven and driving members comprising a stub journaled in each of said members, each of said stubs having a round bottom slot with a rounded bottom longitudinally thereof, and a rotary motion transmitting link member having a laterally flat and endwise rounded portion on each end thereof and angular with each other and movably seated on the corresponding bottoms of said slots, and an oiling device on said casing located over said diametrically smaller portion to fill with lubricant the space between the same and the interior of said casing.

In testimony of the foregoing, I affix my signature.

JOHN H. KING.